United States Patent [19]

McKenna

[11] Patent Number: 4,772,653

[45] Date of Patent: Sep. 20, 1988

[54] STAIN RESISTANT COOKWARE FROM BLENDS COMPRISING AN INTERPOLYMER OF AN UNSATURATED DICARBOXYLIC ACID COMPOUND

[75] Inventor: Lawrence A. McKenna, Flemington, N.J.

[73] Assignee: Amoco Corporation, Chicago, Ill.

[21] Appl. No.: 98,536

[22] Filed: Sep. 18, 1987

Related U.S. Application Data

[63] Continuation-in-part of Ser. No. 796,103, Nov. 8, 1985, abandoned.

[51] Int. Cl.$^4$ .................. C08K 3/26; C08L 81/06; C08L 69/00; C08L 79/08
[52] U.S. Cl. ..................... 524/427; 524/449; 524/451; 524/456; 524/508; 525/132; 525/148; 525/150; 525/180; 525/183
[58] Field of Search ............... 524/427, 508, 513, 514, 524/449, 451, 456; 525/132, 133, 148, 150, 180, 183

[56] References Cited

U.S. PATENT DOCUMENTS

| | | | |
|---|---|---|---|
| 3,792,115 | 2/1974 | Kishikawa | 525/148 |
| 3,933,941 | 1/1976 | Yonemitsu et al. | 525/133 |
| 3,966,842 | 6/1976 | Ludwig et al. | 525/148 |
| 4,002,701 | 1/1977 | Katchman | 524/508 |
| 4,077,934 | 3/1978 | Lee | 524/508 |
| 4,126,602 | 11/1978 | Salee | 524/513 |
| 4,289,668 | 9/1981 | Li | 524/310 |
| 4,386,176 | 5/1983 | Fukuda et al. | 525/132 |
| 4,469,843 | 9/1984 | Lordi | 525/67 |
| 4,480,057 | 10/1984 | Sano | 524/508 |
| 4,503,168 | 3/1985 | Hartsing | 523/100 |
| 4,588,764 | 5/1986 | Lee | 524/508 |

FOREIGN PATENT DOCUMENTS 2053238 2/1981 United Kingdom .

Primary Examiner—Lewis T. Jacobs
Attorney, Agent, or Firm—Donald M. Papuga; William H. Magidson; Ralph C. Medhurst

[57] ABSTRACT

Tough, stain-resistant microwave cookware can be fabricated from an injection-moldable thermoformable blend, comprising:

A. a thermoformable interpolymer, comprising at least one unsaturated dicarboxylic acid compound polymerized with at least one vinyl monomer, in an amount between about 25 and about 75 weight % based on the weight of the unfilled blend, and B. at least one thermoformable polymer, selected from the group consisting of polycarbonates (including polyestercarbonates), poly(aryl ether sulfone) resins, polyarylates, and polyetherimides in an amount between about 75 and about 25 weight % based on the weight of the unfilled blend.

43 Claims, No Drawings

STAIN RESISTANT COOKWARE FROM BLENDS COMPRISING AN INTERPOLYMER OF AN UNSATURATED DICARBOXYLIC ACID COMPOUND

REFERENCE TO RELATED APPLICATION

This application is a Continuation-In-Part application of U.S. patent application Ser. No. 796,103, filed Nov. 8, 1985) now abandoned.

FIELD OF THE INVENTION

This invention relates to microwave cookware fabricated from thermoformable, preferably thermoplastic, polymer blends comprising a thermoformable interpolymer of at least one unsaturated dicarboxylic acid compound polymerized with at least one vinyl monomer, and a thermoformable polymer selected from polycarbonates, polyarylates, poly(aryl ether) resins, and polyetherimides.

BACKGROUND OF THE INVENTION

Blends derived from interpolymers of an $\alpha,\beta$-unsaturated dicarboxylic acid or anhydride combined with a polar resin such as a polysulfone or a polycarbonate, together with other blend components are known. For example, U.S. Pat. No. 4,289,668 to Li discloses polymer systems plasticized with a hydroxy substituted fatty acid wherein the polymer system contains such an interpolymer and can additionally be combined with a polar resin. The fatty acid is incorporated into the blend specifically to improve its processability and flowability, manifesting its addition by lowering torque relative to the unplasticized blend. The patentees state that their plasticized resin system is characterized by improved heat resistance. It has been found, however, that including a hydroxy substituted fatty acid in such a blend lowers the blend's heat distortion temperature, detracts from dimensional stability, and makes the blend relatively susceptible to severe staining by food and blistering in cooking applications.

Other patents disclose various blends which include components selected from interpolymers of unsaturated dicarboxylic acid compounds, polycarbonates, polyarylates, and poly(aryl ether) resins. U.S. Pat. No. 4,469,843 to Lordi discloses thermoplastic molding compositions which comprise a rubber modified styrene-maleic anhydride non-equimolar copolymer and polycarbonate resin. U.S. Pat. No. 4,126,602 to Salee discloses aromatic polyester compositions comprising a linear aromatic polyester and a polymer comprising the reaction product of a styrene/maleic anhydride copolymer and a diene rubber. U.S. Pat. No. 3,966,842 to Ludwig et. al., discloses thermoplastic compositions obtained by blending specified proportions of a polycarbonate resin with a rubber-reinforced styrene/maleic anhydride copolymer. U.S. Pat. No. 3,792,115 to Kishikawa et. al. discloses thermoplastic resin compositions comprising polycarbonate resin and polyarylene ester.

None of the above patents disclose that an interpolymer containing unsaturated dicarboxylic acid moieties blended with a polyarylate, a polycarbonate, a poly(aryl ether) resin, or a polyetherimide would be suitable for use as microwave cookware, nor do these patents address the special problems which must be considered in the manufacture of cookware such as heat resistance coupled with stain resistance.

Microwave cookware articles must possess dimensional stability adequate to readily withstand moderate temperature environments like those generated by heating food in a microwave field (typically on the order of at least about 250° F.), coupled with stain resistance which permits using the cookware with substantially all foods. Stain resistance is a particularly important feature when using microwave cookware to cook foods containing staining pigments such as carotenoids contained in ketchup, mustard, and many vegetables. Importantly, materials for microwave cookware should also possess toughness so that articles made therefrom are not easily broken by dropping, and should be readily thermoformable as by injection molding so that more expensive manufacturing procedures (e.g., such as compression molding) need not be employed.

U.S. Pat. No. 4,503,168 to Hartsing, Jr. discloses cookware formed from a polyarylethersulfone which may be blended with a poly(aryl ether) or a thermoplastic polymer selected from polyarylates, polyetherimides, polyesters, aromatic polycarbonates, styrene resins, poly(alkyl acrylates), polyhydroxyethers, poly(arylene sulfides), and polyamides. The patent does not disclose the cookware of this invention.

THE INVENTION

This invention provides microwave cookware fabricated from thermoformable blends, comprising:

A. a thermoformable interpolymer, comprising at least one unsaturated dicarboxylic acid compound polymerized with at least one vinyl monomer, in an amount between about 25 and about 75 weight % based on the weight of the unfilled blend, and B. at least one thermoformable polymer, selected from the group consisting of polycarbonates (including polyestercarbonates), poly(aryl ether) resins, polyarylates and polyetherimides, in an amount between about 75 and about 25 weight % based on the weight of the unfilled blend.

Each component in the blend is preferably thermoplastic an thus readily injection moldable. The blends have good economics while providing dimensional stability and god stain resistance and permitting high filler loadings.

For somewhat higher use temperatures, exceeding about 275° F., in a preferred embodiment the microwave cookware is fabricated from blends comprising:

A. a thermoformable interpolymer, comprising at least one unsaturated dicarboxylic acid compound polymerized with at least one vinyl monomer, in an amount between about 25 and about 75 weight % based on the weight of the unfilled blend;

B. (i) a thermoformable poly(aryl ether) resin containing recurring units of the formula $$-O-EOE'-$$

wherein E is the residuum of a dihydric phenol and E' is the residuum of a benzenoid compound having an electron withdrawing group in at least one of the positions ortho and para to the valence bonds and wherein both of said residua E and E' are bonded to ether oxygens through aromatic carbon atoms, (ii) a thermoformable polyarylate derived from a dihydric phenol and at least one aromatic dicarboxylic acid, or (iii) a polyetherimide, said poly(aryl ether) resin, polyarylate or polyetherimide being present in an amount between about 75 and about 25 weight % based on the weight of the unfilled blend; and C. a thermoformable aromatic polycarbonate in an amount between about 1 and about 15 weight % based on the weight of the unfilled blend.

Poly(aryl ether) resins and polyetherimides are preferred for use in the preferred embodiment due to their outstanding heat and chemical resistance, particularly stain resistance. Polyarylates are preferred due to their inexpensiveness.

Advantageously, the inclusion of an aromatic polycarbonate resin (or polyestercarbonate resin) in a blend of interpolymer and poly(aryl ether) resin, polyarylate, or polyetherimide, in the proportions noted, improves the toughness and impact resistance of the blend and the tendency to breakage of articles fabricated therefrom is substantially reduced, but with little if any sacrifice in stain resistance. Dimensional stability of such a ternary blend also remains superior for microwave applications.

POLYARYLETHER RESIN

The poly (aryl ether) resin suitable for use in forming the microwave cookware of this invention is a linear, thermoplastic polyarylene polyether containing recurring units of the following formula:

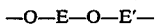

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms, and wherein at least one of E and E' contains —$SO_2$—. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)-propane, 1,1-bis(4-hydroxphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclear pheonols can be characterized as having the structure:

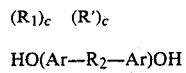

HO(Ar—$R_2$—Ar)OH wherein Ar is an aromatic group and preferably is a phenylene group, $R_1$ and R' can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_2$ is representative of a bond between aromatic carbon atoms as in dihydroxy-diphenyl, or is a divalent radical, including for example, radicals such as:

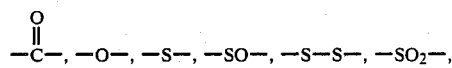

and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl) alkanes such as;
2,2-bis-(4-hydroxyphenyl)propane,
2,4-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis- (4,hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane, and the like;
di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;
di(hydroxyphenyl)ethers such as
bis-(4-hydroxyphenyl)ether, the 4,3'-, 4,2'-, 2,2'-, and 2,3-dihydroxyphenyl ethers,
4,4'-dihydroxyl-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorphenyl)ether,
bis-(4-hydroxy-3-bromophenyl)ether,
bis-(4-hydroxynapthyl)ether,
bis-(4-hydroxy-3-chloronaphthyl)ether, and
4,4'-dihydroxyl-3,6-dimethoxydiphenyl ether.

Useful dihydric phenols also include the following:

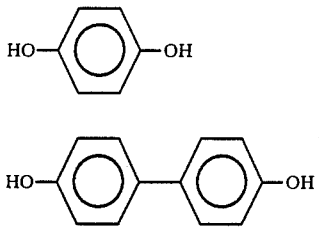

As herein used the E term defined as being the "residuum of the dihydric phenol" of course refers to the residue of the dihydric phenol after the removal of the two aromatic hydroxyl groups. Thus as is readily seen, these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed to form an E' benzenoid residuum in this invention, which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine and chlorine substituted benzenoid reactants are preferred; the flourine compounds for fast reactivity and the chlorine compounds for their inexpensiveness.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, imide trifluoromethyl, nitroso, and hetero nitrogen, as in pyridine.

(b) divalent groups which can activate displacement of alogens on two different rings, such as the sulfone group

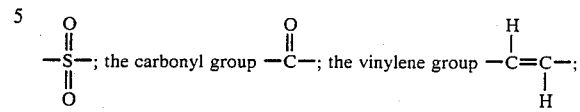

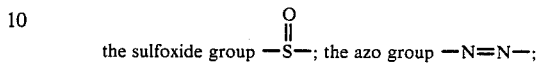

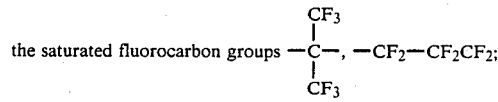

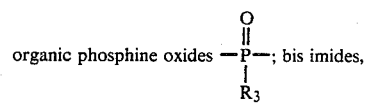

where $R_3$ is a hydrocarbon group, and the ethylid group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

Examples of benzenoid compounds which are useful in contributing E' residua to a poly(aryl ether) resin are the following:
4.4'-dichlorodiphenylsulfone,
4,4'-diflurodiphenylsulfone,
4,4'-bis(4-chlorophenylsulfonyl)biphenyl,
4,4'-bis(4-fluorophenylsulfonyl)biphenyl,
4,4'-diflurobenzophenone,
4,4'-dichlorobenzophenone,
4,4'-bis(4-fluorobenzoyl)benzene,
4,4'-bis(4-chlorobenzoyl)benzene,
2,6-dichlorobenzonitrile,
isomers thereof, and the like.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Patent No. 847,963 wherein the bisphenol and dihalobenzenoid compounds are heated in the presence of potassium carbonate using a high boiling solvent such as diphenylsulfone.

Preferred polyarylene polyethers of this invention are those prepared using the dihydric polynuclear phenols of the following types, including the derivatives thereof which are substituted with inert substituent groups

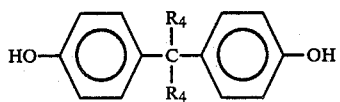

in which the $R_4$ groups represent independently hydrogen, lower alkyl, aryl and the halogen substituted groups thereof, which can be the same or different;

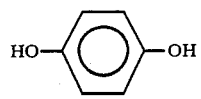

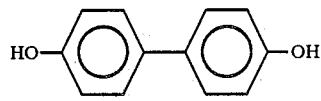

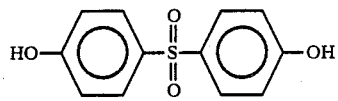

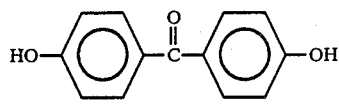

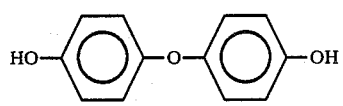

It is also contemplated in this invention to use a mixture of two or more different dihydric phenols to accomplish the same ends as above. Thus when referred to above the —E— residuum in the polymer structure can actually be the same or different aromatic residua.

The poly(aryl ether)s have a reduced viscosity of from about 0.35 to about 1.5 dl/gm as measured in an appropriate solvent at an appropriate temperature depending on the particular polyether, such as in methylene chloride at 25° C.

The preferred poly(aryl ether)s have repeating units of the following formulae, wherein at least one of the recurring units in the polymer contains —$SO_2$—:

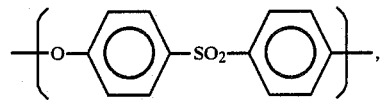

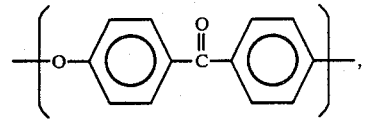

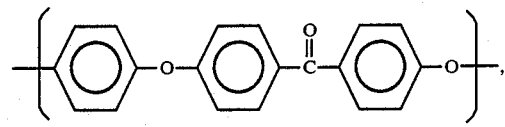

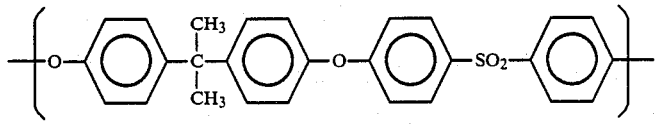

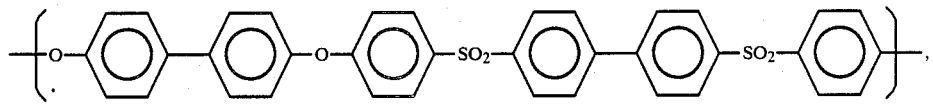

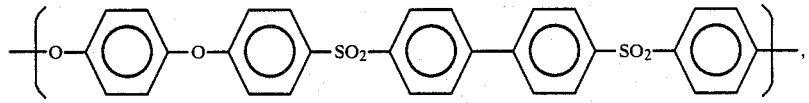

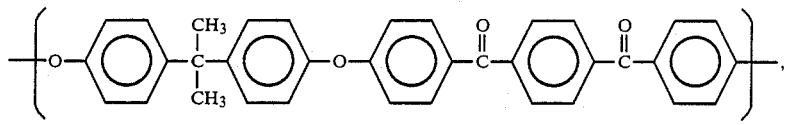

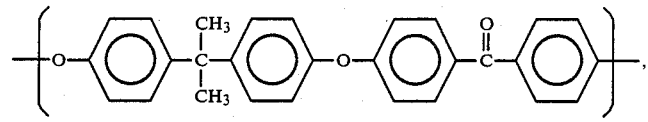

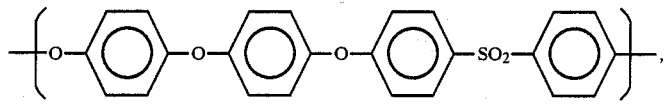

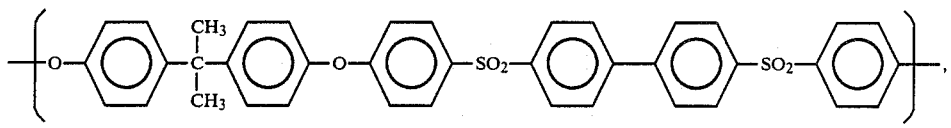

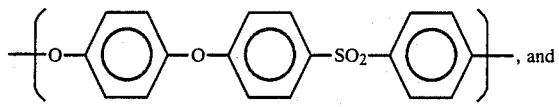

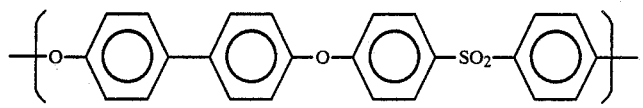

Polymers having repeat units or subunits as illustrated above are disclosed, for example, in U.S. Pat. Nos. 4,175,175; 4,320,224; 4,108,837; 4,009,149; 3,455,866; 3,518,067; 3,764,583; 3,400,065; 3,647,751; European patent (EP) application number 81107193.5, published Mar. 24, 1982 under the publication number 0047999; and EP application 80201194.0, published June 3, 1981 under the publication number 0029633.

POLYARYLATES

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

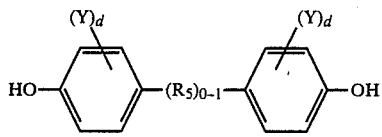

wherein Y is independently selected from, hydrogen, alkyl groups of 1 to 4 carbon atoms, chlorine or bromine, each d, independently, has a value of from 0 to 4, inclusive, and $R_5$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis-4(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)-methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and naphthalene diols.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable for use herein is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

AROMATIC POLYCARBONATE

The aromatic polycarbonates that can be employed herein are, generally, thermoplastic homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3', 5'tetrabromo-4-4'-dihydroxydiphenyl)propane, (3,3'dichloro-4,4'dihydroxydiphenyl)methane, and the like. Other dihydric phenols of the bisphenol type are described in, for example, U.S. Pat. Nos. 2,999,835, 3,028,365, and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di(halophenyl)carbonates, such as di(chlorophenyl)carbonate or di(bromophenyl)carbonate, etc., di(alkylphenyl)carbonates such as di(tolyl)carbonate, di(naphthyl)carbonate, di(chloronaphthyl)carbonate, etc. or mixtures thereof. The haloformates suitable for use herein include bishaloformate of dihydric phenols for example, bischloroformates of bisphenol-A, of hydroquinone, etc., or glycols, for example, bischloroformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriohenylphosphonium bromide and methyl-triphenyl phosphonium bromide.

The polycarbonates can be prepared in a one-phase (homogeneous solution) or a two-phase (interfacial) system when phosgene, or a haloformate are used. Bulk reactions are possible when the diarylcarbonate precursors are used.

Also, aromatic polyester carbonates may be used, and these are intended to be encompassed by the term "aromatic polycarbonate". Suitable polyester carbonates are described in, for example, U.S. Pat. No. 3,169,121, herein incorporated by reference. The preferred polyester carbonate results from the condensation of phosgene, terephthaloyl chloride, and/or isophthaloyl chloride with bisphenol-A and a small amount of p-tert-butylphenol.

Suitable polycarbonates are commercially available, for example, under the registered trademarks LEXAN (General Electric Co.) and MERLON (Mobay Chemical Co.).

INTERPOLYMERS OF UNSATURATED DICARBOXYLIC ACID COMPOUNDS AND VINYL MONOMERS

The interpolymers of unsaturated dicarboxylic acid compounds are polymers comprising at least one unsaturated dicarboxylic acid, ester, or anhydride (the term "dicarboxylic acid compound" is intended to be generic to the entire class of such compounds) copolymerized with at least one vinyl monomer. The interpolymers can be used singly or in combination in the blends. The term "interpolymer" is intended to encompass copolymers of one unsaturated dicarboxylic acid compound with one vinyl compound.

Preferred as the dicarboxylic acid compounds for use in making the interpolymers are the $\alpha,\beta$-unsaturated acids and esters having the formula:

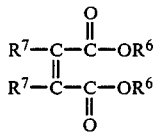

(I)

wherein each $R^7$ is independently halogen (Cl, Br or I), alkyl of 1–8 carbon atoms (e.g., methyl, ethyl, n-propyl, isopropyl, butyl, n-butyl, pentyl, hexyl, heptyl, octyl etc.) or aryl or aralkyl containing up to about 8 carbon atoms, and wherein $R^6$ is hydrogen or alkyl of from 1–8 carbon atoms (e.g., the same as the exemplary alkyl groups for $R^6$ above). The anhydrides are also preferred and are, of course, obtained by removing a molecule of water from the corresponding acids ($R^6$=H) and thus have the formula:

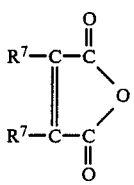

(II)

wherein $R^7$ is as defined above.

Suitable examples of $\alpha\beta$-unsaturated dicarboxylic acid compounds are well known in the art and include the following:
maleic acid
maleic anhydride
methyl maleic anhydride
propyl maleic anhydride
1,2-diethyl maleic anhydride
phenyl maleic anhydride
benzyl maleic anhydride
chloro maleic anhydride
heptyl maleate
citraconic anhydride
ethyl fumarate
fumaric acid
mesaconic acid
ethyl isopropyl maleate
isopropyl fumarate
hexyl methyl maleate
phenyl maleic anhydride Other unsaturated dicarboxylic compounds not conforming to formulas (I) and (II), such as itaconic acid, the lower $C_{1-8}$) alkyl esters, thereof, and itaconic anhydride may also be used.

The vinyl monomers which may be copolymerized with the unsaturated dicarboxylic acid compound are known and described, for example, in U.S. Pat. No. 4,289,669. The vinyl monomer serves to connect the unsaturated dicarboxylic acid compounds. A large number of vinyl compounds are useful in this invention, the only requirements being that the compound contain a single, addition-polymerizable double bond and that the compound not contain any groups which would adversely affect the polymerization, e.g., by scavenging free radicals if the interpolymer is fabricated by a method employing a free radical initiator. Suitable vinyl monomers generically include those of the formula

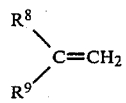

wherein
$R^8$ is hydrogen or an alkyl group containing from 1 to about 8 carbon atoms, more preferably 1 to 4 carbon atoms and most preferably from about 1 to about 2 carbon atoms, and $R^9$ is hydrogen or an alkyl, alkenyl, alkoxy, acyl, phenyl, substituted phenyl, nitrile, carboxyl, carboxylic ester or carboxylic amide group, or
$R^8$, $R^9$ and the carbon atom to which they are attached form a cyclic or bicyclic group.

A useful class of vinyl monomers includes hydrocarbon alpha olefins such as ethylene, propylene, butene, isobutylene, and octene.

Also useful are vinyl aliphatic hydrocarbon ethers

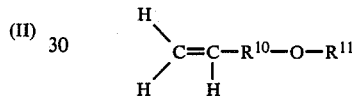

wherein $R^{10}$ and $R^{11}$ are independently aliphatic alkyl having about 1–8 carbon atoms, or aryl of 6–18 carbon atoms. $R^{10}$ can also be a direct bond. Examples of these compounds are: methyl vinyl ether, propyl vinyl ether, and phenyl vinyl ether.

Also useful as vinyl monomers are vinyl esters (e.g., vinyl acetate, vinyl propionate, isopropenyl acetate, isopropenyl butyrate), vinyl acids and esters thereof e.g., acrylic acid, methacrylic acid, and their lower alkyl esters (methyl, ethyl, propyl, etc.), vinyl amides (e.g., acrylamide, methacrylamide and N, N-dimethyl acrylamide), allyl esters (e.g., allyl acetate, allyl butyrate), vinyl halides (e.g., vinyl chloride and vinyl bromide), vinyl nitriles (e.g., acrylonitrile and methacrylonitrile) and mixtures thereof.

A preferred class of vinyl compounds comprises styrene and derivatives thereof not containing groups which would interfere with the polymerization. Examples of suitable substituents include halogen and groups such as haloalkyl, alkyl, alkoxy, alkoxyalkyl, aryl and nitro. Specific styrene derivatives include:
2-methylstyrene
4-chlorostyrene
4-ethylstyrene
2-methylstyrene
2-phenylstyrene
4-methoxystyrene
3-nitrostyrene
2,4-dimethylstyrene
isopropylstyrene
2-methyl-4-benzylstyrene
2-methyl-4-benzylstyrene Methods of making copolymers or interpolymers comprising an unsaturated dicarboxylic acid monomer with a vinyl monomer such as the monomers enumerated supra are well known in the art and are disclosed in numerous references, such as the following patents, each of which is herein incorporated by reference for the disclosure and exemplification therein of polymerization methods: U.S. Pat. Nos. 2,615,845; 2,988,539; 3,087,893; 2,938,016; 2,980,653; 3,085,994; 3,342,787; 3,418,292; 3,451,979; 3,558,570; 3,702,300; 3,723,375.

Particularly preferred for use in making cookware articles are blends containing copolymers of styrene with maleic acid and/or maleic anhydride. Suitable copolymers are available under the registered trademark DYLARK (Arco Chemical Co.), including the rubber modified versions thereof. Rubber-modified copolymers are preferred for their good impact properties. Non rubber-modified copolymers are preferred for their high gloss and good aesthetic appeal.

D. POLYETHERIMIDES

The polyetherimides suitable for use in this invention are well known in the art and are described in, for example, U.S. Pat. Nos. 3,847,867, 3,838,097 and 4,107,147.

The polyetherimides are of the following formula:

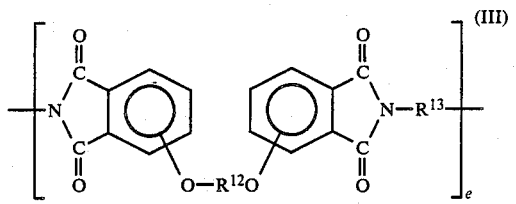
(III)

wherein e is an integer greater than 1, preferably from about 10 to about 10,000 or more, —O—$R^{12}$—O— is attached to the 3 or 4 and 3' or 4' positions and $R^{12}$ is selected from (a) a substituted or unsubstituted aromatic radical such as

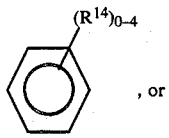
, or

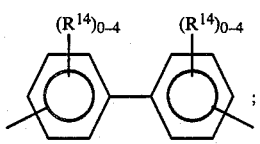

(b) a divalent radical of the formula:

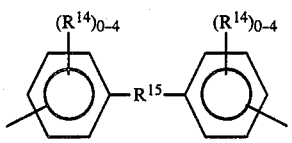

wherein $R^{14}$ is independently $C_1$ to $C_6$ alkyl, aryl or halogen and $R^{15}$ is selected from

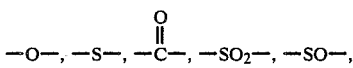

alkylene of 1 to 6 carbon atoms, cycloalkylene of 4 to 8 carbon atoms, alkylidene of 1 to 6 carbon atoms or cycloalkylidene of 4 to 8 carbon atoms, $R^{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

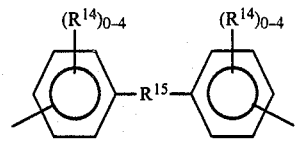

wherein $R^{14}$ and $R^{15}$ are as previously defined.

The polyetherimides may also be of the following formula:

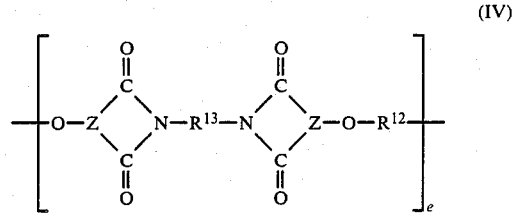
(IV)

wherein —O—Z is a member selected from

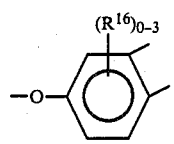

wherein $R^{16}$ is independently hydrogen, lower alkyl or lower alkoxy

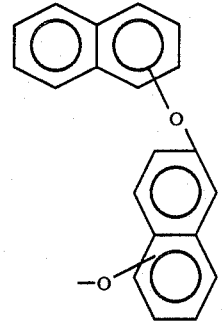
and, wherein the oxygen may be attached to either ring and located ortho or para to one of the bonds of the imide carbonyl groups, and $R^{12}$ and $R^{13}$ and e are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (III) can, for example, be obtained by any of the methods well-known to those skilled in the art including the reacting of any aromatic bis(ether anhydride)s of the formula:

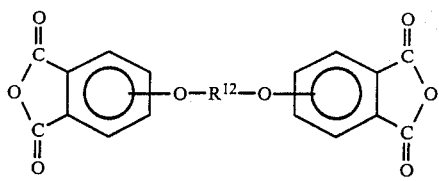 (V)

where $R^{12}$ is a defined hereinbefore, with a diamino compound of the formula

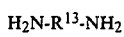 (VI)

where $R^{13}$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20 to about 250° C. Alternatively, the polyetherimides can be prepared by melt polymerization of any dianhydrides of Formula (V) with any diamino compound of Formula (VI) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides. However, in certain instances, a slight molar excess (about 1 to 5 mole percent) of diamine can be employed resulting in the production of polyetherimides of Formula III having a intrinsic viscosity $\eta$ greater than 0.2 deciliters per gram, preferably 0.35 to 0.60, or 0.7 decilitiers per gram or even higher when measured in m-cresol at 25° C.

The aromatic bis(ether anhydride)s of Formula (V) include, for example, 2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxyy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxphenox)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc. and mixtures of such dianhydrides.

The organic diamines of Formula (VI) include, for example, m-phenylenediamine, p-phenylenediamine, 2,2'bis(p-aminophenyl)propane, 4,4'-diaminodiphenylmethane, 4,4'-diaminodiphenyl sulfide, 4,4'-diaminodiphenyl sulfone, 4,4'-diaminodiphenyl ether, 1,5-diaminonaphthalene, 3,3'dimethylbenzidine, 3,3'-dimethoxybenzidine.

The polyetherimides of formula (IV) may, for example, be prepared by effecting reaction in the presence of a dipolar aprotic solvent of a mixture of ingredients comprising, for instance, (1) a bis(nitropahthalimide) of the general formula:

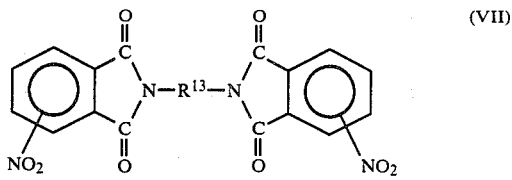 (VII)

wherein $R^{13}$ is defined as hereinabove, and (2) an alkali metal salt of an organic compound of the general formula:

MO-$R^{12}$-OM (VIII)

wherein M is an alkali metal and $R^{13}$ is defined as hereinabove.

The bis(nitrophthalimide) used in preparing the polymer is formed by reacting a diamine of the formula described above, $NH_2$-$R^{13}$-$NH_2$, with a nitro substituted aromatic anhydride of the formula:

 (IX)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride, and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated, for example, by 2-nitronaphthalic anhydride, 1-nitro-2,3-naphthalenedicarboxylic anhydride and 3-methoxy-6-nitrophthalic anhydride, and the like.

With reference to the alkali metal salts of formula (VIII) among the divalent carbocyclic aromatic radicals which $R^{12}$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R^{12}$ may be a residue of a dihydroxyl diarylene compound in which the aryl nuclei are joined by either an aliphatic group, a sulfoxide group, sulfonyl group, sulfur, carbonyl group, oxygen, etc. Typical of such diarylene compounds are the following:
2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-phenyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;
bis(4-hydroxyphenyl)sulfide;
bis(4-hydroxyphenyl)sulfone; and the like.

When dialkali metal salts of formula (VIII) are used with the compound illustrated by formula (VII), the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula (VIII) may be employed. When the molar ratios are approximately equal, the polymer is substantially terminated by a=Z—NO₂ at one end and a phenolic group at the other end. If there is a molar excess of one compound, that particular terminal group will predominate.

The conditions of reaction whereby the alkali-metal salt of formula (VIII) is reacted with the dinitro-substituted organic compound of formula (VII) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed a which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula (VII) and the alkali-metal salt of formula (VIII) (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20% by weight of polymer is preferably employed.

The preferred polyetherimides include those having repeating units of the following formula:

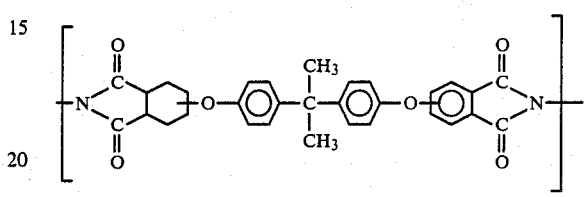

BLENDS

The individual components comprising the blend can be added together in a mixture and compounded as well known in the art. The following is a description for processing the blends of the preferred embodiment of this invention and can be readily adapted to blends containing fewer components.

Commercially available polymeric ingredients useful in the invention are normally sold as cubical pellets which can be mixed together with fillers or pigments in the required proportions by any one of a variety of methods such as tumble blending in a twin shell mixer such as those made by Patterson Kelley Co. or mixing in sigma blade mixers or ribbon blenders such as those available under the registered trademark NAUTA (Day Mixing Company, Cincinnati, Ohio), and others. The ingredients thus mixed are then homogenized by melting the polymeric components at 300°–350° C. while at the same time subjecting the blended ingredients to a high shear rate which causes any inert inorganic ingredients (such as calcium carbonate or titanium dioxide fillers) to become thoroughly wetted by and uniformlY dispersed in the molten polymers. By extruding the resulting molten mass through appropriately sized dies, multiple strands can be obtained and chopped into cubical or other suitably shaped pellets for feeding to an injection molding or extrusion apparatus. Twin screw extruders result in the most efficient and homogeneous mixing and hence are preferred. The pellets may conveniently be stored until needed prior to molding cookware articles.

To avoid degradation of properties, the aromatic polycarbonate should be dried at about 250° F., before making the blend and the exposure of the interpolymer to high heat should be kept to a minimum. Therefore, depending on the particular polycarbonate employed, it may be advantageous to feed the various blend components into different zones or at different points along the melt processing line when making the blend. The preferred arrangement consists of a Werner-Pfleiderer twin screw ZSK extruder-mixer equipped with a smaller ZDSK extruder-mixer as a side arm which delivers a molten mix into the ZSK main extruder at a point about ⅓ the distance from the hopper to the die. Such an arrangement permits the formulation to be compounded as follows. The poly(aryl ether) resin and, optionally, pigment or filler, are tumble blended and fed into the hopper of the main ZSK. Aromatic polycarbonate is dried and processed through the side arm ZDSK. The interpolymer may be added through the side arm or, to reduce its heat history to a minimum, it can also be added, through a stuffer, directly into the main ZSK downstream of the side arm ZDSK. If filler is incorporated in the formulation, it can be added through the stuffer also to minimize wear on the equipment. Typical line conditions for compounding are:

|  | ZSK | ZDSK |
|---|---|---|
| Feed | Poly(aryl ether)/ pigment | Polycarbonate/ interpolymer |
| Melt Temp., °C. | 325 | 250 |
| Screw, rpm | 125 | 50 |
| Power, KW | 7.0 | 1.9 |
| % Torque | 38 | 29 |
| Rate, lb./hr. | 100 | |

In the preferred embodiment the individual components are blended in an amount of about 25 to about 75 weight % of the poly(aryl ether) resin or the polyarylate, about 25 to 74 % of the dicarboxylic acid/vinyl interpolymer, and about 1 to about 15 weight % of the aromatic polycarbonate, all weight percentages being based on the unfilled blend components. Preferred ranges are 50 to 60 weight percent of the poly(aryl ether) resin, and 30 to 45 weight % of the aromatic polycarbonate.

Advantageously, the interpolymer tends to have a lower viscosity relative to the other components and to concentrate on the exterior of cookware articles thermoformed from the blend, and thus maximize the stain resistance of cookware articles. The poly(aryl ether) resin and the polyarylate contribute good heat resistance and dimensional stability to the blend. If continual use in aggressive environments such as hot bacon grease or harsh detergents is contemplated, it is preferred to make the blend with a poly(aryl ether) resin. The aromatic polycarbonate adds toughness, manifested as resistance to breakage, without adversely affecting the heat distortion temperature or, importantly, stain resistance.

In the blends used to make the cookware of this invention polyetherimide may be substituted in whole or in part, as desired, for polyarylate and/or poly(aryl ether) resin. Polyetherimide is desirable as a blend component due to its high softening point (i.e. good heat resistance), and also for its good stain resistance. The inventor has determined that in a mustard staining test as described in Example V, infra, polyetherimide (available under the registered trademark ULTEM® from General Electric) containing a white pigment showed no visual staining after exposure to mustard in a microwave oven for 90 seconds at full power. Polyetherimides are often obtained as a brownish material and, to enhance aesthetics, it is preferred to employ polyetherimide which has been whitened with any pigment commonly used for such purpose such as titanium dioxide, zinc oxide, or zinc sulfide.

As previously noted, blends of this invention are readily amenable to the inclusion of fillers, although it is preferred to employ the unfilled blends to fabricate cookware articles. The fillers may be used in powdered, granular or platelet form, suitable fillers being talc, calcium carbonate, mica, titanium dioxide, or milled glass. Fibrous fillers such as calcium silicate (wollastonite) or glass fibers may also be employed. Particle or fiber size is not critical, although a size should not be used which is large enough to render the surface of an article rough or aesthetically unacceptable. The amount of such fillers which may be used is between 0 and about 40 weight %, preferably between 0 and about 10 weight %, based on the weight of the filled blend.

The invention is further described and disclosed by means of the following examples which are not to be taken as limiting the scope of the invention.

COOKWARE

The cookware of this invention may be any type of container or tray which is used to heat or cook food. The cookware may be of any shape or design with dimensions dependent upon the desired end use. Representative cookware is found in, for example, U.S. Pat. Nos. 3,938,730; 3,743,077 and 3,955,170. Also, representative designs of cookware are described in, for example, Des. 236,574; 194,277, and 236,182. The cookware may be used to heat and bake all types of food, including frozen food, in a microwave oven.

EXAMPLES

The blends described in the following examples were molded on conventional injection molding equipment, either plunger or reciprocating screw type. If the latter was employed, a ring valve screw tip was preferred over a ball check valve. Barrel heaters and screw rpm were adjusted to give a melt temperature of, preferably, about 490°-520° F. The barrel can be vented or unvented, although a vented barrel was used in these Examples. The shot size varied from about 20% to about 90% of barrel capacity with the preferred range being 50-75%.

The mold can be filled cold (i.e., at ambient room temperature) if matter surfaces on the finished molded article are acceptable, or can be filled hot if surface smoothness and gloss are desired. Both types of finishes have been produced using the present invention. The mold was maintained near room temperature by circulating cooling water through it. If high gloss was desired on the molded part, heated oil was circulated through the mold to raise its temperature to about 300° F. With filler present in the formulation, the speed at which the molten formulation was injected into the mold was as slow as possible, fill times being preferably longer than 10 seconds for a shot size of about 90 grams, consistent with ability to fill the mold cavity. Mold temperatures of at least about 275° F. facilitated mold filling at slow speeds and further enhanced the surface appearance of the molded part.

The percentages of each component in the blends of the following examples are weight percentages unless otherwise indicated.

Advantageously, molding apparatus having a barrel with zones which can be heated to different temperatures can be used to implement different mixing efficiencies and adjusted to match the heat stability characteristics of individual blend components, although single barrel temperatures are also useful. Typical conditions used in molding these compositions on a Battenfeld type BA-C, 1100/170 CNC injection molding machine, equipped with a vented barrel, were as follows:

Mold Temperature,

|  |  |
|---|---|
| moving half | 142° C. |
| stationary half | 110° C. |
| Barrel Settings: | |
| Nozzle | 235° C. |
| Zone 1 | 235° C. |
| Zone 2 | 235° C. |
| Zone 3 | 235° C. |
| Zone 4 | 235° C. |
| Zone 5 | 235° C. |
| Hopper | 230° C. |
| Screw Speed | 60 rpm |
| Screw Stroke | 73 mm |
| Melt Temperature | 251° C. |
| Injection: Speed, time | 5 mm/sec, 14.6 seconds |
| Injection: Pressure | 140 Bar |
| Hold: Pressure, time | 100 Bar at 5 mm, 10 seconds |

TABLE 1 presents compositional and physical data for each of six blends made as described above. The blends variously contained components selected from a polysulfone, polycarbonate, styrene-maleic anhydride, hydroxy-substituted fatty acid plasticizer, and calcium carbonate/titanium dioxide filler, as indicated.

Each blend was injection molded to form identical ASTM test specimens from which the physical properties shown in TABLE 1 were determined, except for melt flow which was measured using compounded pellets. Tensile strength, tensile elongation, and tensile modulus were determined according to ASTM 638-72. Tensile impact strength was determined according to ASTM D1822. Heat distortion temperature (HDT) was determined according to ASTM 648-72. Melt Flow was determined according to ASTM D1238-73.

TABLE 1 shows that adding a hydroxy-substituted fatty acid greatly degrades impact strength and HDT.

EXAMPLE I

TABLE 1

| BLENDS[1] | 1 | 2 | 3 | 4 | 5 | 6 |
|---|---|---|---|---|---|---|
| Polysulfone (UDEL[2] p-3703) | 39.5 | 39.5 | 39.5 | 39.5 | 39.5 | 39.5 |
| SMA resin (DYLARK ® 332) | 26.3 | 26.3 | 26.3 | — | — | — |
| SMA/Rubber (DYLARK ® 350) | — | — | — | 26.3 | 26.3 | 26.3 |
| Polycarbonate (LEXAN ® 101) | — | 6.8 | — | — | 6.8 | — |
| Calcium Carbonate | 32.9 | 26.3 | 26.3 | 32.9 | 26.3 | 26.3 |
| Titanium Dioxide | 1.3 | 1.1 | 1.1 | 1.3 | 1.1 | 1.1 |
| 12 Hydroxystearic acid | — | — | 6.8 | — | — | 6.8 |
| PROPERTIES OF INJECTION MOLDED COMPOSITIONS | | | | | | |
| Tensile Strength, psi | 9,160 | 9,170 | 5,480 | 6,430 | 8,340 | 4,660 |
| Tensile Elongation, % | 1.49 | 1.79 | 2.50 | 1.25 | 3.53 | 1.74 |
| Tensile Modulus, psi | 702,000 | 624,000 | 395,000 | 661,000 | 518,000 | 360,000 |
| Tensile Impact Strength, ft-lbs/in$^2$ | 7.6 | 9.5 | 5.4 | 5.9 | 9.9 | 4.2 |
| Heat Deflection Temp., ¼", °C. | 132 | 133 | 97 | 135 | 136 | 96 |
| PROPERTIES OF COMPOUNDED PELLETS | | | | | | |
| Melt Flow at 275° C., g/10' | 6.1 | 6.9 | 80.5 | 4.2 | 3.8 | 4.7 |

[1]Component fractions reported as weight percentages
[2]Registered trademark of Amoco Corporation

EXAMPLE II

This Example shows the effect of increasing the volume percentage of polycarbonate in the blends.

Blends 7-11 having the volume % compositions indicated were compression molded into ASTM test specimens and physical properties determined as in Example I, tabulated in TABLE 2.

TABLE 2

| BLEND[1] | 7 | 8 | 9 | 10 | 11 |
|---|---|---|---|---|---|
| Polysulfone (UDEL ® P-3703) | 0.55 | 0.50 | 0.45 | 0.40 | 0.35 |
| Polycarbonate (LEXAN ® 101) | 0.05 | 0.10 | 0.15 | 0.20 | 0.25 |
| SMA-Rubber (DYLARK ® 350) | 0.40 | 0.40 | 0.40 | 0.40 | 0.40 |

[1]Component Fractions reported as volume percentages

To a volume of 1.0 of each of the above was added 0.3 volume of titanium oxide. The tensile moduli for each blend are shown immediately following:

| TENSILE MODULUS AT 160° C. (320° F.), Psi, | 68,900 | 51,100 | 20,700 | 11,300 | 8,890 |
|---|---|---|---|---|---|

TABLE 2 shows that increasing the volume fraction of polycarbonate reduces tensile modulus at elevated temperature, thus reducing the rigidity in cookware, at use temperatures above about 275° F., it is preferred to employ about 1 to about 15 weight % of polycarbonate in the blends. At use temperatures of about 300° to about 325° F., it is preferred to employ blends containing about 4 to about 8 weight % polycarbonate. At use temperatures of about 275° F. and below, much larger weight %'s of polycarbonate, up to about 75 wt. %, may be used as in the broadest embodiment of this invention.

EXAMPLE III

Correlative to Example II, this Example shows that an aromatic polycarbonate can be incorporated into the blends to increase toughness without substantial sacrifice of other desirable cookware properties.

Blends 12 and 13 having the weight % compositions indicated were molded into ASTM test specimens and physical properties determined at room temperature as in Example I, are tabulated in TABLE 3.

TABLE 3

| BLEND[1] | 12 | 13 |
|---|---|---|
| Polysulfone (UDEL ® P-3703) | 50% | 45% |
| SMA-Rubber (DYLARK ® 350) | 50% | 45% |
| Polycarbonate (LEXAN ® 101) | — | 10% |
| Tensile Strength, psi | 6,980 | 7,230 |

TABLE 3-continued

| BLEND[1] | 12 | 13 |
| --- | --- | --- |
| Tensile Modulus, psi | 339,000 | 337,000 |
| Tensile Elongation, % | 6.3 | 7.8 |
| Notched Izod Impact Strength ft-lbs/in$^2$ | 0.98 | 1.54 |
| Heat Deflection Temp. ⅛", °C. | 119 | 127 |

[1]See TABLE 1

TABLE 3 shows that incorporating as much as about 10 weight % of polycarbonate into the blends of the preferred embodiment results in substantially increasing impact strength. Concomitantly, HDT is actually increased, thus showing no effect on, and an actual improvement in dimensional stability at cooking temperatures. 10 weight % of polycarbonate represents a more preferred upper limit of polycarbonate in the blends although amounts of polycarbonate in the range of about 4–8 weight % may be more desirable at high use temperatures (i.e. exceeding about 300° F.), as shown in Example II.

EXAMPLE IV

This example demonstrates the suitability of cookware articles of this invention for use under conditions simulated to meet or exceed those likely to be encountered in normal household use.

The following blend 14 having the weight % composition indicated was molded into test specimens and physical properties determined as in Example I, are tabulated in TABLE 4.

TABLE 4

| Blend[1] | 14 |
| --- | --- |
| Polysulfone (UDEL P-3703) | 55.3% |
| SMA-Rubber (DYLARK 350) | 36.8% |
| Polycarbonate (LEXAN 101) | 6.8% |
| Filler (TiO$_2$ pigment) | 1.1% |
| Tensile Strength, psi | 8230 |
| Tensile Modulus, psi | 356,000 |
| Tensile Elongation, % | 56.5 |
| Notched Izod Impact Strength, ft.-lbs./in. | 0.86 |
| Heat Deflection Temp. ⅛", °C. | 142 |
| Tensile Impact Strength ft.-lb./in.$^2$ | 17.3 |

[1]See TABLE 1

Test specimens measuring five inches long by one half (½) inch wide and one eighth (⅛) inch thick were mounted in a test jig that supported each end of the test specimen. The test jig was equipped with an adjusting screw by which the test specimen could be made to deflect at its center, thus causing the test specimen to form an arc along its longest axis. The adjusting screw was adjusted to produce a deflection at the center of the test specimen of 0.1 inch, thereby inducing an applied stress of about 3000 psi in the outer fiber of the test specimen. Specimens so stressed were placed in separate bread pans and covered with bacon grease and heated in a conventional forced air oven to a temperature of 225° F., or covered with a liquid dishwashing aid available under the registered trademark JET DRY (Economics Laboratory, Inc.) and heated to a temperature of 160° F.

The test specimens stressed and treated as above showed no visual evidence of crazing or cracking after 24 hours of heated immersion in the dishwashing aid or after 24–48 hours of heated immersion in bacon grease.

By contrast, test specimens otherwise identical except for being fabricated out of the polysulfone alone showed visual crazing under a stress of 1800 psi upon immersion in bacon grease at 225° F. after 48 hours, and cracked under a stress of 1000 psi at 160° F. upon immersion in dishwashing aid after 48 hours.

EXAMPLE V

This Example demonstrates the good stain resistance and blister resistance of cookware articles of this invention.

The blend of Example IV (herein referred to as "unmodified blend") was molded into test specimens as described in Example IV. Additionally, a second portion of the blend of Example IV was further compounded with 15 parts per hundred (pph, based on the weight of the unmodified blend) of 12-hydroxystearic acid (herein referred to as "modified blend") and molded into test specimens. The test specimens were tested for stain resistance as follows.

Onto each test specimen a teaspoon of Yellow mustard (available from the R.T. French Co., One Mustard St., Rochester, N.Y. was deposited and the specimen was then placed into a microwave oven (Panasonic Model NE9830) at full power for 15 seconds. The specimen was then removed, the mustard was cleaned from the specimen, and the specimen was visually examined for staining.

This procedure was repeated five trials in succession, on each successive trial applying mustard to a different area of the test specimen and increasing, in 15 second increments, the time of exposure to the microwave field. In this manner, the effects of exposing freshly mustard-treated areas to longer and longer periods of radiation (i.e. 15, 30, 45, 60, 75, and 90 seconds) were determined.

The test specimens made from the unmodified blend showed no discernible staining even after the longest (90 sec.) exposure period.

The test specimens made from the modified blend showed a successively intensely stained series of blotches varying from slight staining (15 sec. exposure) to severe staining (90 sec. exposure). All of the blotches were readily perceptible upon casual inspection.

Test specimens made from both the modified and unmodified blend were also placed in a microwave oven at full power for 15 minutes and then inspected. Unmodified blend test specimens showed no visually perceptible blisters while modified blend test specimens showed severe blistering.

It is further noted that the act of molding the modified blend test specimens discolored them from white (unmolded blend) to tan (molded test specimen).

What is claimed is:

1. Cookware fabricated from an injection-moldable thermoplastic blend, comprising:
    A. a thermoformable interpolymer, comprising at least one unsaturated dicarboxylic acid compound polymerized with at least one vinyl monomer, in an amount between about 25 and about 75 weight %, based on the weight of the unfilled blend, and
    B. at least one thermoformable polymer selected from the group consisting of aromatic polycarbonates, poly(aryl ether sulfone) resins, polyarylates, and polyetherimides in a amount between about 75 and about 25 weight %, based on the weight of the unfilled blend.

2. Cookware as defined in claim 1, additionally comprising a filler.

3. Cookware as defined in claim 2, wherein said filler is selected from the group consisting of talc, mica, titanium dioxide, calcium carbonate, and calcium silicate.

4. Cookware as defined in claim 1, wherein said thermoformable polymer is a poly(aryl ether sulfone) resin.

5. Cookware as defined in claim 4, wherein said poly(aryl ether sulfone) resin contains recurring units of the formula

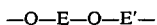

wherein E is the residuum of a dihydric phenol and E' is the residuum of a benzenoid compound having an inert electron withdrawing group in at least one of the positions ortho and para to the valence bonds, both of said residua being valently bonded to the ether oxygens through aromatic carbon atoms, with the proviso that at least one of E and E' contains a sulfone group.

6. Cookware as defined in claim 5, wherein said dihydric phenol residuum is derived from a phenol selected from the group consisting of:

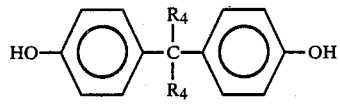

in which the $R_4$ groups represent independently hydrogen, lower alkyl, aryl and the halogen substituted groups thereof,

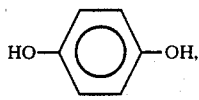

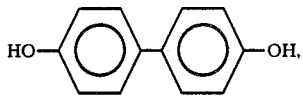

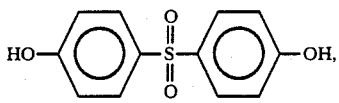

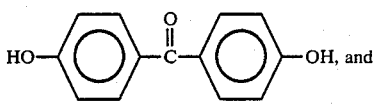

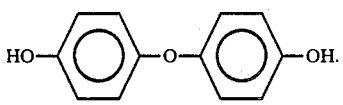

7. Cookware as defined in claim 4, wherein said poly(aryl ether sulfone) resin contains recurring units selected from the following, with the proviso that at least one of the recurring units in the polymer contains a sulfone group:

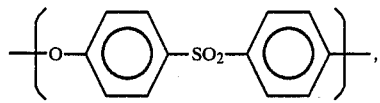 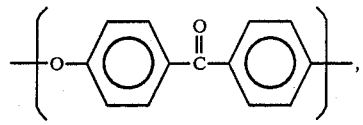

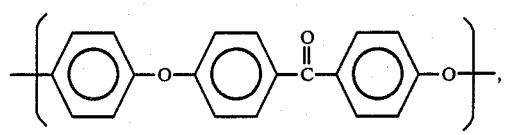

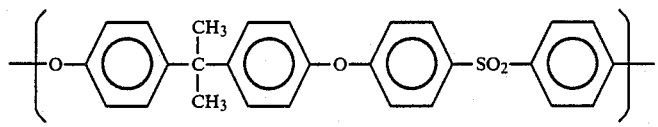

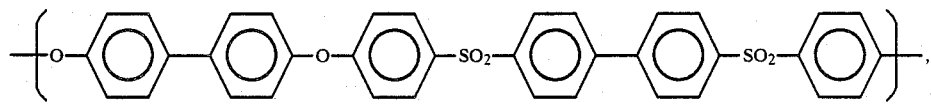

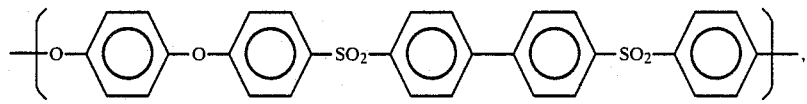

-continued

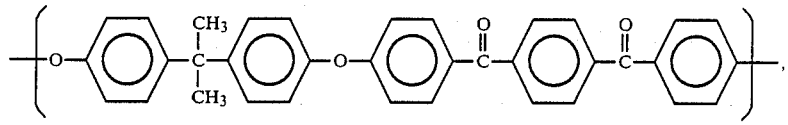

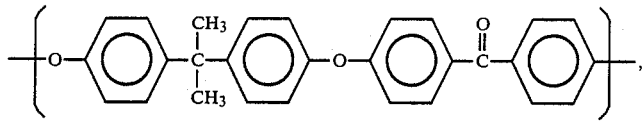

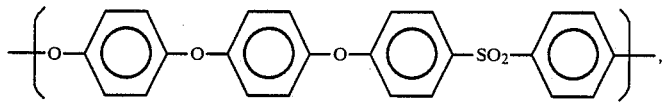

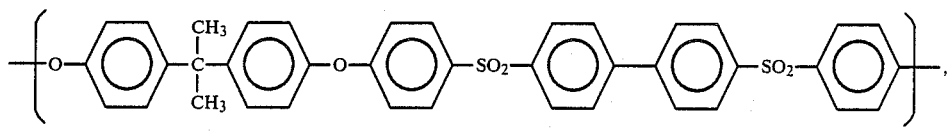

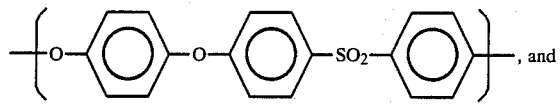, and

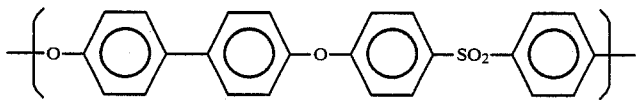

8. Cookware as defined in claim 1, wherein said thermoformable polymer is a polyarylate.

9. Cookware as defined in claim 8, wherein said polyarylate is derived from a dihydric phenol and at least one aromatic dicarboxylic acid.

10. Cookware as defined in claim 9 wherein the dihydric phenol is of the formula:

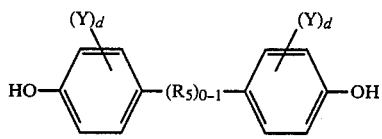

wherein Y is independently selected from, hydrogen, alkyl groups of 1 to 4 carbon atoms, chlorine or bromine, each d, independently, has a value of from 0 to 4, inclusive, and $R_5$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, SO$_2$, or S.

11. Cookware as defined in claim 9 wherein the aromatic dicarboxylic acid is terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers.

12. Cookware as defined in claims 10 or 11 wherein the polyarylate is derived from bisphenol A and terephthalic acid or isophthalic acid, or mixtures thereof.

13. Cookware as defined in claim 1, wherein said thermoformable polymer is a polycarbonate.

14. Cookware as defined in claim 13 wherein said polycarbonate is prepared by reacting at least one dihydric phenol with a carbonate precursor.

15. Cookware as defined in claim 14, wherein said dihydric phenol is a bisphenol.

16. Cookware as defined in claim 14, wherein said carbonate precursor is a carbonyl halide, a carbonate ester, or a haloformate.

17. Cookware as defined in claim 13, wherein said polycarbonate is a polyestercarbonate.

18. Cookware as defined in claim 1, wherein said unsaturated dicarboxylic acid compound has the structure

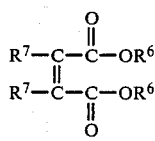

or

-continued

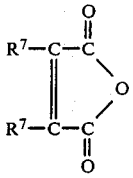

wherein each $R^6$ is independently hydrogen or alkyl of 1–8 carbon atoms and wherein each $R^7$ is independently halogen, alkyl of 1–8 carbon atoms, or aryl or aralkyl of 1–8 carbon atoms.

19. Cookware as defined in claim 1, wherein said vinyl monomer is styrene or styrene containing a substituent selected from the group consisting of haloalkyl, alkyl, alkoxy, alkoxyaryl, aryl and nitro.

20. Cookware as defined in claim 1, wherein the thermoplastic polymer is a polyetherimide.

21. Cookware as defined in claim 20, wherein the polyetherimide polymer is of the following formula:

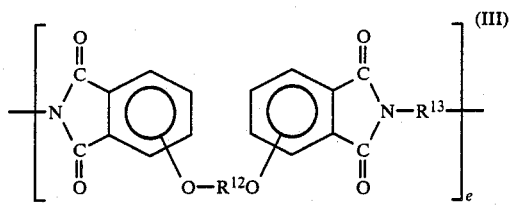

wherein e is an integer greater than 1, preferably from about 10 to about 10,000 or more, —O—$R_{12}$—O— is attached to the 3 or 4 and 3' or 4' positions and $R_{12}$ is selected from (a) a substituted or unsubstituted aromatic radical such as

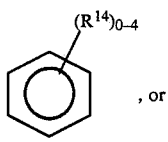

, or

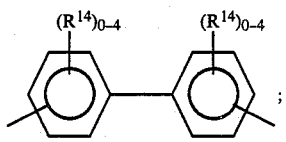

(b) a divalent radical of the formula:

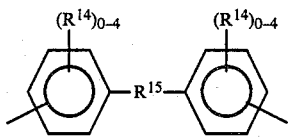

wherein $R_{14}$ is independently $C_1$ to $C_6$ alkyl, aryl or halogen and $R_{15}$ is selected from

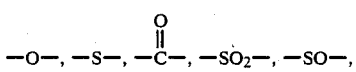

alkylene of 1 to 6 carbon atoms, cycloalkylene of carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

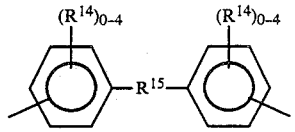

wherein $R_{14}$ and $R_{15}$ are as previously defined.

22. Cookware as defined in claim 20, wherein the polyetherimide is of the following formula:

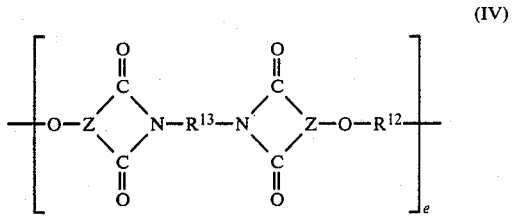

wherein —O—Z is a member selected from

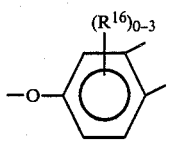

wherein $R_{16}$ is independently hydrogen, lower alkyl or lower alkoxy

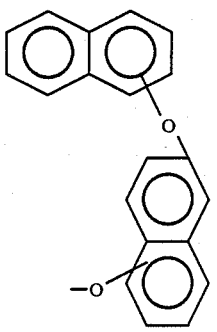

and, wherein the oxygen may be attached to either ring and located ortho or para to one of the bonds of the imide carbonyl groups, $R_{12}$ and $R_{13}$ and e are as defined in claim 22.

23. Cookware as defined in claim 20, wherein the polyetherimide has repeating units of the following formula;

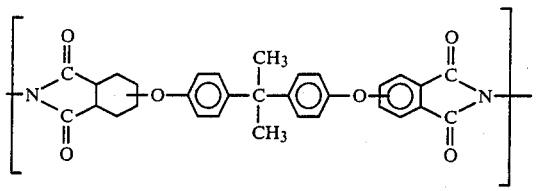

24. Cookware fabricated from an injection-moldable thermoplastic blend, comprising:
A. a thermoformable interpolymer, comprising at least one unsaturated dicarboxylic acid compound polymerized with at least one vinyl monomer, in an amount between about 25 and about 75 weight %, based on the weight of the unfilled blend:
B.
(i) a thermoformable poly(aryl ether sulfone) resin containing recurring units of the formula

—O—E—O—E'— wherein E is the residuum of a dihydric phenol and E' is the residuum of a benzenoid compound having an electron withdrawing group in at least one of the positions ortho and para to the valence bonds and wherein both of said residua E and E' are bonded to ether oxygens through aromatic carbon atoms, with the proviso that at least one of E and E' contains a sulfone group;
(ii) a polyarylate derived from a dihydric phenol and at least one aromatic dicarboxylic acid; or
(iii) a polyetherimide, said poly (aryl ether sulfone) resin, polyarylate or polyetherimide being present in an amount between about 75 and about 24 weight %, based on the weight of the unfilled blend; and
C. a thermoformable aromatic polycarbonate in an amount between about 1 and about 15 weight % based on the weight of the unfilled blend.

25. Cookware as defined in claim 24, additionally comprising a filler.

26. Cookware as defined in claim 25, wherein said filler is selected from the group consisting of talc, mica, titanium dioxide, calcium carbonate, and calcium silicate.

27. Cookware as defined in claim 25, wherein said filler is present in an amount less than about 40 weight %, based on the weight of the filled blend.

28. Cookware as defined in claim 27, wherein said filler is present in an amount less than about 10 weight %.

29. Cookware as defined in claim 24, wherein said poly(aryl ether sulfone) resin is present in an amount of about 50 to about 60 weight %.

30. Cookware as defined in claim 24, wherein said polycarbonate is present in an amount between about 1 and about 10 weight %.

31. Cookware as defined in claim 30, wherein said polycarbonate is present in an amount between about 4 and about 8 percent.

32. Cookware as defined in claim 24, wherein said interpolymer is present in an amount between about 30 and about 45 weight %.

33. Cookware as defined in claim 24, wherein said dihydric phenol residuum is derived from a phenol selected from the group consisting of:

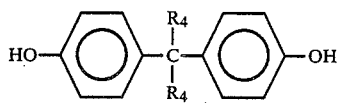

in which the $R_4$ groups represent independently hydrogen, lower alkyl, aryl and the halogen substituted groups thereof,

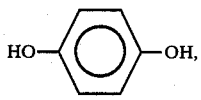

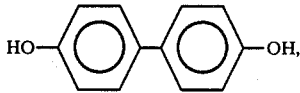

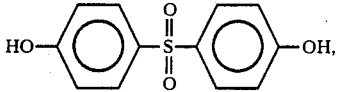

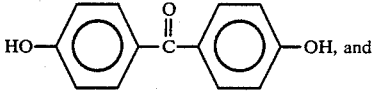

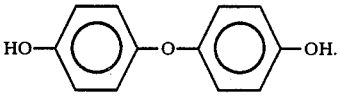

34. Cookware as defined in claim 24, wherein said poly(aryl ether sulfone) resin contains recurring units selected from the following, with the proviso that at least one of the recurring units in the polymer contains a sulfone group.

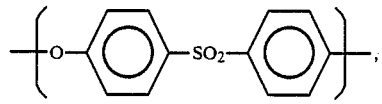 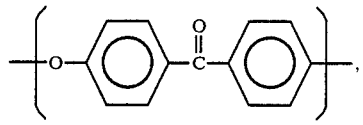

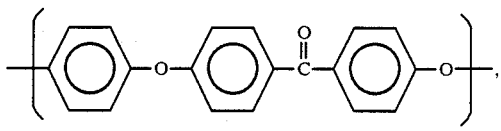

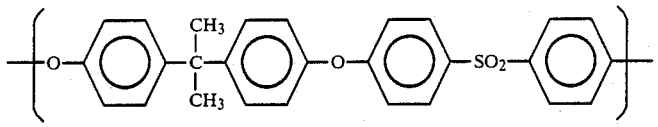

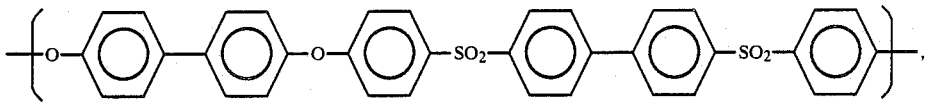,

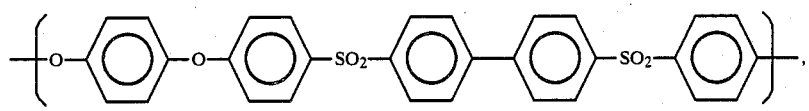,

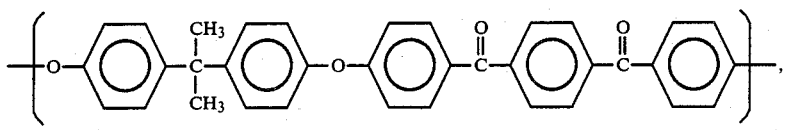,

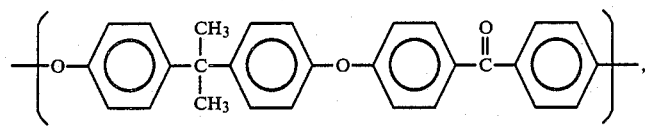,

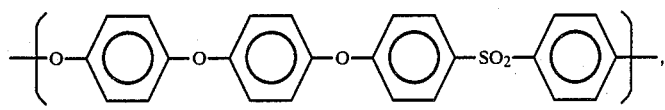,

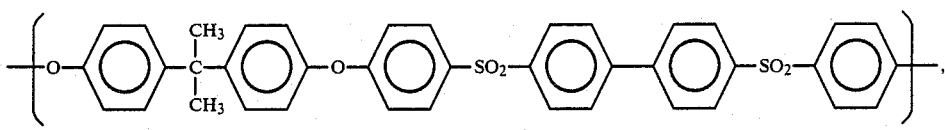,

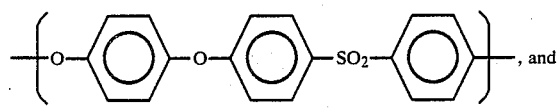, and

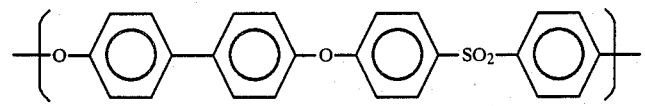

35. Cookware as defined in claim 24, wherein the dihydric phenol used to derive said polyarylate is of the formula:

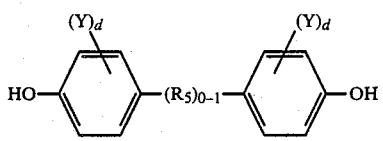

wherein Y is independently selected from, hydrogen, alkyl groups of 1 to 4 carbon atoms, chlorine or bromine, each d, independently, has a value of from 0 to 4, inclusive, and $R_5$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, or S.

36. Cookware as defined in claim 24, wherein the aromatic dicarboxylic acid used to derive said polyarylate is terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers.

37. Cookware as defined in claim 24, wherein the polyarylate is derived from bisphenol A and terephthalic acid or isophthalic acid, or mixtures thereof.

38. Cookware as defined in claim 24, wherein said polycarbonate is a polyestercarbonate.

39. Cookware as defined in claim 24, wherein said unsaturated dicarboxylic acid compound has the structure;

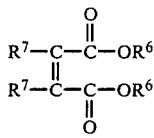

or

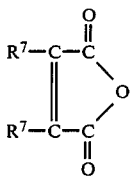

wherein each $R^6$ independently hydrogen or alkyl of 1–9 carbon atoms and wherein each $R^7$ is independently halogen, alkyl of 1–8 carbon atoms, or aryl or aralkyl of 1–8 carbon atoms.

40. Cookware as defined in claim 24, wherein said vinyl monomer is styrene or styrene containing a substituent selected from the group consisting of haloalkyl, alkyl, alkoxy, alkoxyaryl, aryl and nitro.

41. Cookware as defined in claim 24, wherein the polyetherimide polymer is of the following formula:

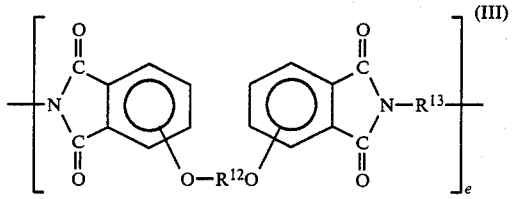

wherein e is an integer greater than 1, preferably from about 10 to about 10,000 or more, —O—$R_{12}$—O— is attached to the 3 or 4 and 3' or 4' positions and $R_{12}$ is selected from (a) substituted or unsubstituted aromatic radical such as

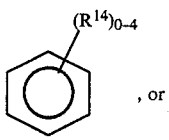, or

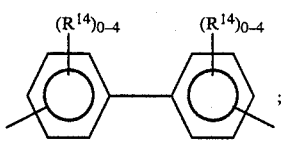

(b) a divalent radical of the formula:

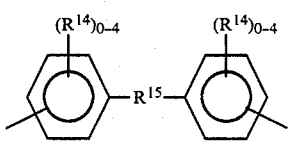

wherein $R_{14}$ is independently $C_1$ to $C_6$ alkyl, aryl or halogen and $R_{15}$ is selected from

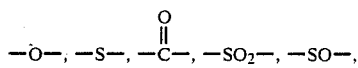

alkylene of 1 to 6 carbon atoms, cycloalkylene of 4 to 8 carbon atoms, alkylidene of 1 to 6 carbon atoms or cycloalkylidene of 4 to 8 carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

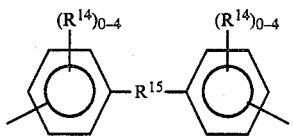

wherein $R_{14}$ and $R_{15}$ are as previously defined.

42. Cookware as defined in claim 24 wherein the polyetherimide is of the following formula:

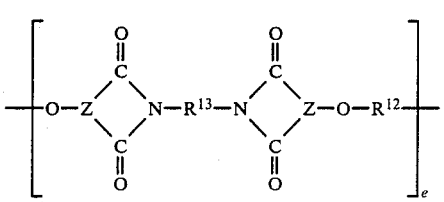

wherein —O—Z is a member selected from

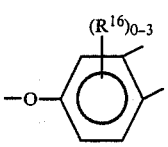

wherein $R_{16}$ is independently hydrogen, lower alkyl or lower alkoxy

and,

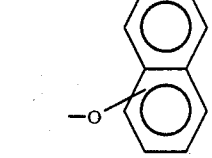

wherein the oxygen may be attached to either ring and located ortho or para to one of the bonds of the imide carbonyl groups, $R_{12}$ and $R_{13}$ and e are as defined in claim 22.

43. Cookware as defined in claim 24 wherein the polyetherimide has repeating units of the following formula:
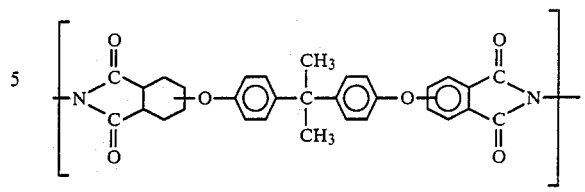

UNITED STATES PATENT OFFICE
CERTIFICATE OF CORRECTION

Patent No. 4,772,653　　　　　　　　　　Dated September 20, 1988

Inventor(s) Lawrence A. McKenna

It is certified that error appears in the above-identified patent and that said Letters Patent are hereby corrected as shown below:

PATENT

| Column | Line | |
|---|---|---|
| 6 | 30 | "ethylid" should read --ethylidene-- |
| 12 | 42 | "n-butyltriohenylphosphonium" should read --n-butyltriphenylphosphonium-- |
| 13 | 60 | "$C_{1-8}$)" should read --($C_{1-8}$)-- |
| 17 | 53 | "dicarboxyphenoxyy" should read --dicarboxyphenoxy-- |
| 18 | 14 | "(nitropahthalimide)" should read --(nitrophthalimide)-- |
| 21 | 25 | "to 74%" should read --to about 74 weight %-- |
| 28 | 29 | "claim 4," should read --claim 5,-- |
| 31 | 64-65 | "of carbon atoms" should read --of 4 to 8 carbon atoms-- |

Signed and Sealed this

Twenty-eighth Day of February, 1989

Attest:

DONALD J. QUIGG

Attesting Officer　　　Commissioner of Patents and Trademarks